Patented Sept. 23, 1941

2,256,505

UNITED STATES PATENT OFFICE 2,256,505

COSMETIC

Marvin R. Thompson, Great Neck, N. Y., assignor to William R. Warner & Company, Inc., New York, N. Y., a corporation of Delaware No Drawing. Application March 25, 1939, Serial No. 264,121

5 Claims. (Cl. 167—90)

This invention relates to ointments and cosmetics and relates particularly to astringent, deodorant and antiperspirant preparations and processes for making the same.

Ointments and cosmetics of the type now commonly in use include as a base or basic ingredient, such materials as fats, oils, waxes and soaps, in which are suspended perfumes, medicinal preparations and coloring matter. Oily, fatty or waxy bases have a number of disadvantages which are well known, namely, that they stain clothing and leave an undesirable greasy residue on the skin. Furthermore, such oily, fatty, waxy and soapy bases decrease the astringency and bactericidal properties of astringents and antiseptics, respectively, that are mixed therewith.

An object of the present invention is to provide compositions for use in ointments or cosmetics which have an unguentary, ointment-like or cerate consistency, but at the same time are non-staining and do not decrease the effectiveness of medicinal preparations mixed therewith.

Another object of the invention is to provide a non-irritating base for ointments or cosmetics that may have its hydrogen ion concentration adjusted within a wide range and which is odor adsorbent and astringent.

An additional object of the invention is to provide an astringent and deodorant product which is non-irritating and devoid of harmful effects upon clothing and other fabrics.

A further object of the invention is to provide processes for making ointments and cosmetics which will neither dry nor harden when subjected to the oxidizing and drying action of the atmosphere, and which permit of adjustment of their hydrogen ion concentration to avoid irritation of, and to promote healing of the skin.

Cosmetic or ointment bases of the type embodying the invention, consist generally of amphoteric, highly adsorbent colloidal hydrogels of alumina, holding a large percentage of water in their composition and containing a hydroscopic material capable of retaining water in the product, thereby maintaining constant the consistency of the alumina hydrogel product. The composition may be mixed with any desired type of coloring material or perfume, and likewise may hold, in suspension, antiseptic, medicinal, or astringent materials.

The aluminium hydrogel base is characterized by being an odorless, semi-solid white or translucent material, which similarly to aluminium salts, such as, for example, aluminium sulfate, is an astringent.

Inasmuch as such hydrogels of alumina are amphoteric, it is possible to control their preparation so that their hydrogen ion concentration may be varied widely, and to produce compositions having widely varying characteristics. For example, aluminium hydrogels may be prepared that are insoluble in comparatively strong acid, while others dissolve quickly in the same strength of acid. Thus, their hydrogen ion concentrations can be varied at will, in order to provide preparations that are not harmful, and may be in many instances, actually beneficial to the human skin. Also, hydrogels of aluminium may be gas adsorbing or liquid adsorbing, as may be desired, depending upon the method of preparation. Likewise, the consistency of the product may be varied by its method of preparation, so that more or less viscous or plastic products may be produced.

The preferred base for cosmetic creams is so prepared that it is odor or gas adsorbent, has a pH of between about 5.0 and 6.5, is of gelatinous consistency when applied, and will not dry to powdery form.

In accordance with the present invention, the preferred type of aluminium hydrogel may be prepared by dissolving a water-soluble salt of aluminium, such as aluminium sulfate, or aluminium chloride, in water, preferably at boiling temperature. About one pound of salt may be dissolved in each gallon of water, although these proportions may be varied considerably. Diluted or undiluted ammonia water or other alkali hydroxide is then sprayed into the aluminium salt solution, with vigorous stirring, until a pH of 5.0 to 6.5 is attained. Alternately, ammonia water may be added until the salt solution is just alkaline to litmus, and then a solution of acid aluminium salt, such as aluminium chloride or sulfate, is added until a hydrogen ion concentration of 5.0 to 6.5 is attained.

While the preferred range of hydrogen ion concentrations is between a pH of 5.0 and 6.5, since this closely approximates the hydrogen ion concentration of the human skin, it will be understood that the hydrogel of alumina may be adjusted to any pH between 2 and 10 by the addition of alkali or acid, depending upon the specific nature of the product desired. It has been found that healing of the skin is often facilitated by regulating its pH to an optimum condition for healing. Because of the facility with which the pH of the aluminium hydrogels may be adjusted, my product is most suitable for controlling the pH of the skin during healing.

The aluminium hydrogel that is formed during the reaction is allowed to settle and the clear liquid is drawn off and discarded. The gel is then washed repeatedly with water until tests show that the soluble ammonium salt formed in the reaction is substantially absent from the hydrogel.

The hydrogel is then freed from excess water by pressure filtration or centrifuging until the total solids content of the gel is between 15 and 25% by weight of the gel, the remainder consisting of colloidally bound water.

In order to retain the water content of the hydrogel at a constant percentage, a hydrophilic or hygroscopic material is then added to the gel and intimately mixed therewith. The hygroscopic polyhydroxy alcohols such as for example glycerin, glycol, ethylene glycol, propylene glycol or diethylene glycol, are entirely satisfactory for this purpose. These compositions not only tend to retain the water in the hydrogel, but also improve the plasticity of the composition and act as solvents for medicinal, coloring and perfuming materials. Other hygroscopic substances, such as, for example, calcium chloride, pectin and zinc chloride may likewise be used.

To this basic composition may be added medicinal preparations, perfume or coloring materials in the desired proportions, in order to provide a suitable product for the purpose desired. Mild astringents and antiseptics that are non-irritating to the skin, such as for example, aluminum phenolsulfonate, zinc stearate, zinc oxide, benzoic acid, boric acid and amyl phenol, are suitable for use in preparations including an aluminum hydrogel. The zinc compounds and boric acid, in addition to their astringent, bactericidal and healing properties, impart an improved consistency and appearance to the composition, inasmuch as they increase the total solids content and opacity of the composition.

Typical examples of astringent and deodorant preparations are given below.

Example I

| | Grams |
|---|---|
| Alumina hydrogel (prepared as indicated above) | 100 |
| Glycerin | 25 to 60 |
| Benzoic acid | 1 |
| Zinc oxide | 1 |
| Perfume and artificial flesh color tint in any desired quantity. | |

In this preparation, which has a consistency similar to ointments or face creams, the alumina hydrogel and zinc oxide serve as astringents, and the alumina hydrogel, because of its method of preparation, acts as a gas and odor adsorbent. The benzoic acid serves as an antiseptic, having undiminished bactericidal properties. The composition is highly effective as an astringent, deodorant and antiperspirant.

Example II

A composition having similar characteristics may be prepared by mixing

| | Grams |
|---|---|
| Alumina hydrogel | 100 |
| Propylene glycol | 25 to 60 |
| Amyl phenol | 0.5 |
| Perfume and/or tint, in any desired quantity. | |

This composition likewise is an astringent and deodorant and similarly to the composition disclosed in Example I, may be applied to the skin without forming a powdery or greasy composition.

While the examples of the products given above are astringent and deodorant preparations, it will be understood that other cosmetics and ointments such as face and hand creams, for example, may be prepared in a similar manner. Inasmuch as the alumina hydrogel is non-irritating to the skin and may be used in many instances where fatty, waxy, or oily bases are undesirable, it will be apparent that its field of usage is extremely wide.

Accordingly, compositions embodying the invention may be varied widely to suit the particular purpose desired, without departing from the invention, and the examples set forth above, therefore, should be considered as illustrative only, and not as limiting the scope of the following claims.

I claim:

1. A method of preparing a base for antiperspirants and deodorants comprising dissolving a water soluble acid aluminum salt in boiling water in the proportion of about one pound of said salt to one gallon of water, adding an alkali to the boiling solution until it attains a pH of between 5.0 and 6.5 and a precipitate of aluminum hydroxide is formed, separating the precipitate from said solution and reducing the water content of the precipitate to between about 75 and 85% of the total weight of said precipitate and mixing therewith a hygroscopic substance capable of maintaining the water content and consistency of said hydrogel substantially constant.

2. The method of preparing a base for ointments and cosmetics comprising adding alkali to a boiling solution containing a water soluble aluminum salt in the proportion of about one pound of said salt to one gallon of water until the solution is slightly alkaline and an aluminum hydrogel is formed, adding an acid aluminum salt to the solution until the solution attains a pH value between 5.0 and 6.5 and additional aluminum hydrogel is formed, separating the solution from the hydrogel and washing the latter until soluble salts are substantially absent, reducing the water content of the hydrogel to between 75% and 85% to render it ointment-like in consistency and mixing therewith a hygroscopic substance capable of maintaining substantially constant the water content of said hydrogel.

3. A deodorant and antiperspirant preparation having ointment-like consistency, comprising a base for imparting said ointment-like consistency, deodorant and antiperspirant properties to said preparation consisting of about 100 parts by weight of an astringent, odor-absorbent aluminum hydrogel which dries upon application to the skin without leaving a powdery residue and contains about 75 to 85% water by weight, said hydrogel being prepared by reacting an alkali with an acid aluminium salt in boiling aqueous solution at a pH value between 5.0 and 6.5, the salt and the water being in the proportion of about one pound of said salt to one gallon of water, in admixture with about 25 to 60 parts by weight of a hygroscopic substance capable of maintaining the water content of the hydrogel substantially constant.

4. An ointment-like deodorant and antiperspirant preparation, containing as the only ingredient of ointment-like consistency a base consisting of about 100 parts by weight of an odor-absorbent, astringent hydrogel of aluminum containing between 75 and 85% of colloidal bound water, which dries upon application to the skin without leaving a powdery residue, said hydrogel being prepared by reacting an alkali with an acid aluminium salt in boiling aqueous solution at a pH value between 5.0 and 6.5, the salt and water being in the proportion of about one pound of said salt to about one gallon of water, in admixture with about 25 and 60 parts by weight of a hygroscopic polyhydroxy alcohol.

5. A method for preparing a base for ointments and cosmetics comprising forming a hydrogel of alumina at a pH value between 5.0 and 6.5 by reacting an alkali and a water-soluble acid aluminium salt in boiling aqueous solution in the proportion of about one pound of said salt to about one gallon of water, separating said hydrogel from said solution, reducing the water content of the hydrogel to render it ointment-like in consistency and mixing therewith a hygroscopic substance capable of maintaining the water content and consistency of said hydrogel substantially constant.

MARVIN R. THOMPSON.

CERTIFICATE OF CORRECTION.

Patent No. 2,256,505.  September 23, 1941.

MARVIN R. THOMPSON.

It is hereby certified that error appears in the printed specification of the above numbered patent requiring correction as follows: Page 2, second column, line 46, claim 2, after "between" insert --about--; and that the said Letters Patent should be read with this correction therein that the same may conform to the record of the case in the Patent Office.

Signed and sealed this 28th day of October, A. D. 1941.

(Seal)

Henry Van Arsdale,
Acting Commissioner of Patents.